3,189,653
MONO HYDRAZINIUM HYDROXYPOLYALKOXY-
ALKYLALKYLENE-DIAMINES
Bernard Rudner, Pittsburgh, Pa., and Aristotle G. Prapas, Edison, N.J., assignors to W. R. Grace & Co., a corporation of Connecticut
No Drawing. Filed Aug. 20, 1962, Ser. No. 218,091
2 Claims. (Cl. 260—584)

The present application is a continuation-in-part of our application Serial No. 808,910, filed August 27, 1959, now abandoned.

This invention relates to substituted alkylene-diamines containing a quaternized nitrogen. In one specific aspect, it relates to the chloramine adducts of hydroxypolyalkoxyalkylalkylenediamines and related salts.

Chloramine reacts with tertiary amines to give 1,1,1-trisubstituted hydrazinium chlorides, Omietanski and Sisler, J. Am. Chem. Soc., 78, 1211 (1956). This reaction presents practically limitless possibilities for the preparation of new and interesting chemical compounds which because of their structure and inherent physical properties exhibit a wide range of uses. Tertiary amines are readily available bases and chloramine is an excellent reagent since it can be economically obtained in commercial quantities by using the process of Sisler et al. described in U.S. Patent 2,710,248. We have discovered that hydroxypolyalkoxyalkylalkylenediamines give novel adducts when treated with chloramine. These adducts and the salts derived from them show remarkable utility as cationic surface active agents and as intermediates for the preparation of novel cationic polymers.

It is, therefore, an object of the present invention to provide a new generic class of hydrazinium compounds, the novel adducts of chloramine and hydroxypolyalkoxyalkylalkylenediamines and their related salts.

In accordance with the present invention, we have provided a new class of chemical compounds having the general formula:

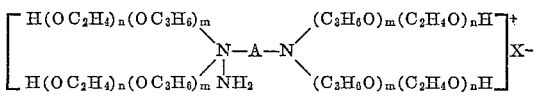

In the above formula, A represents a divalent hydrocarbon radical having two to four carbon atoms, $m$ and $n$ are integers other than zero and X is an inorganic anion.

In preparing the compounds of the present invention, it is usually preferable to contact chloramine with a solution of the appropriate hydroxypolyalkoxyalkylalkylenediamine, allow the reaction to proceed until the desired quantity of chloramine is consumed, and then isolate and purify the resultant hydrazinium chloride by standard laboratory techniques. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. When preformed chloramine is used and good absorption is required for efficient reaction, it has been found desirable to bubble chloramine through a long column of a solution comprising the tertiary amine dissolved or suspended in a relatively cheap inert solvent. The same result may be accomplished by vigorous agitation. By inert solvent it is meant a solvent unreactive under the conditions of the reaction. Solvents which serve this purpose include hydrocarbons, e.g., heptane, cyclohexane, benzene, xylene and the like; ethers, e.g., diethyl ether, diamyl ether, dioxane and anisole; amides, e.g. dimethylformamide and dimethylacetamide; halohydrocarbons, e.g., chloroform, carbon tetrachloride, trichloroethylene and chlorobenzene; alcohols, e.g., isopropyl alcohol and Cellosolve.

It is obvious that not all of the novel hydrazinium compounds of our invention are capable of being prepared directly as described above. In order to provide the other useful salts of the present invention, it is necessary to prepare the compounds containing anions other than chloride by metathesis. Many of the anions can be introduced by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

Normally, the choice of the anion is of minor consequence since the primary activity of our novel compounds resides in the cation. The salts obtained by variation of the anion may in certain cases have special advantages due to solubility, ease of dispersibility or the like. But these considerations are all subsidiary to the characteristics of the cation which are independent of the character of the anion and hence all anions are considered to be equivalent for the purposes of the present invention.

The hydroxypolyalkoxyalkylalkylenediamines suitable as starting materials for the preparations of our novel compounds are manufactured by oxyalkylating the appropriate alkylenediamines. One commercially available series is prepared by treating ethylenediamine with excess propylene oxide to varying molecular weights up to 4500 and then with excess ethylene oxide until the new base obtained contains up to 90% by weight of oxyethylene units or up to a maximum molecular weight of about 27,000. The general reaction scheme is illustrated below:

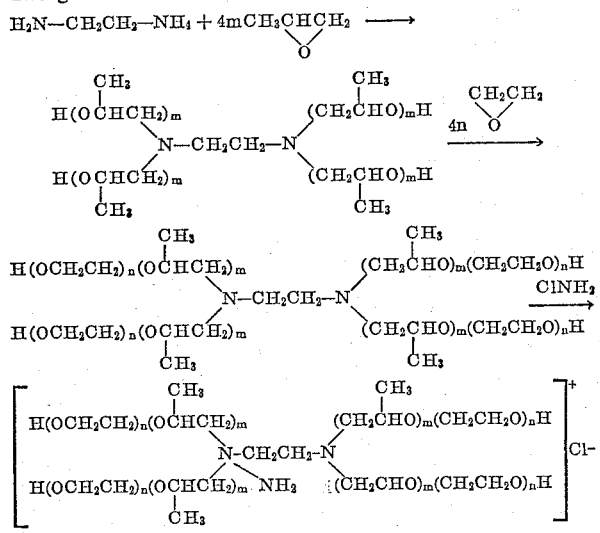

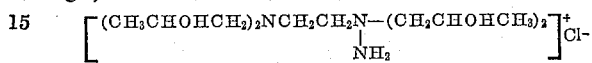

There is no theoretical limitation as to the number of combinations possible or to the number of compounds that can be prepared this way. Nor is there any theoretical reason why alkylation with ethylene oxide could not have been effected first followed by reaction with propylene oxide. Customarily, oxyalkylation is accomplished by running in a fixed amount of the oxirane. Since the reaction of the oxirane with the hydroxyl groups already present on the molecule is very exothermic, it is difficult to control the exact manner in which addition occurs. It would be more accurate to state that $m$ and $n$ represent statistical averages and are not absolutely equal in each compound. The terminology used is shorthand to express the situation that a mixture is present having the average values for $m$ and $n$ or the average molecular weight indicated. Thus the new compositions of this invention are not pure compounds but a difficultly separable series of closely related compounds whose properties and attributes blend to give a composite result.

Our novel compositions are cationic, detergent, surface active materials useful as anti-sticking and anti-static agents. Their solubility and dispersibility is dependent on the number and ratio of oxyethylene and oxypropylene residues in the molecule. An increase in oxyethylene residues favors the molecule's affinity for water and hence promotes its solubility and dispersibility in aqueous systems. Our compounds are also useful as complexing agents, anti-oxidants and corrosion inhibitors and as intermediates for the preparation of polymers and resins containing charged polar groups. The terminal hydroxyl groups are available for reaction with difunctional acids and isocyanates to form polyesters and polyurethanes with various degrees of cross-linking.

The scope and utility of our invention is further illustrated by the following examples:

Example I

Chloramine was prepared by the vapor phase reaction of chlorine and ammonia using a generator constructed according to the teachings of Sisler et al. U.S. Patent 2,710,248.

Tetra - 2 - hydroxypropylethylenediamine commercially available as Quadrol, is an extremely viscous, colorless oil. About 50 g. of this oil was dissolved in 1000 ml. of chloroform and subjected to treatment for one and a half hours with 0.0052 mol of chloramine per minute from the generator. After the treatment had continued for about 5 minutes, a precipitate formed. Active chlorine disappeared from the reaction mixture within 2 hours after the addition of chloramine had been completed. The reaction mixture was filtered, washed with two 100 ml. portions of chloroform and then with acetone. The product was extracted free of ammonium chloride by means of isopropyl alcohol. On evaporation to dryness, 20 g. of 97% pure 1,1-bis-(2-hydroxypropyl)-1-[2-(bis-(2-hydroxypropylamino)ethyl]hydrazinium chloride was obtained. The product, a clear, brown, tacky gum has the structure shown below: (Additional product was obtained from the original filtrate and the acetone washings.)

$$\left[(CH_3CHOHCH_2)_2NCH_2CH_2N-(CH_2CHOHCH_3)_2\right]^+ Cl^-$$
$$\qquad\qquad\qquad\qquad\quad | \atop NH_2$$

Example II

Ethylenediamine when treated with excess propylene oxide gives a water-insoluble clear yellow, viscous oil. This mixture of homologous tetra(poly-2-oxypropyl) ethylenediamines having an average molecular weight of about 1800 corresponding to an average $m$ of about 30 is commercially available under the name Tetronics Base. This base, as a 10% solution in a hydrocarbon solvent, was reacted with a five-fold excess of chloramine from the generator of Example I. After removal of ammonium chloride by filtration, the filtrate was evaporated and the residue triturated alternately with hexane and ether to give 46 g. of a clear, viscous light brown oil. The product, 1,1 - bis(hydroxypolyoxyisopropyl)-1-[2-(bis-hydroxypolyoxyisopropyl)aminoethyl]hydrazinium chloride, was more soluble in water than the starting base.

Example III

A series of polyethers available commercially as "Tetronics," are made by reacting ethylenediamine with an excess of propylene oxide to the desired point of water-insolubility and then with an excess of ethylene oxide to the desired state of water dispersibility. The reactant, "Tetronics 701," a viscous, inhomogeneous, light tan oil, was made by oxypropylating ethylenediamine to a mixture of water-insoluble homologs having an average molecular weight of about 2700 then reacting with ethylene oxide to a molecular weight of approximately 3400 (about 18% oxyethylene content).

About 100 g. of "Tetronics 701" was dissolved in a liter of a high boiling aromatic solvent available commercially as "Solv D." This solution was treated with a chloramine-ammonia-nitrogen gas stream from a generator delivering approximately 0.006 mol of chloramine per minute for 36 minutes. The reaction mixture was allowed to set overnight. Subsequent filtration gave 11 g. of ammonium chloride; titration of the combined filtrate and wash showed it to contain approximately a 10% yield of product dissolved in solvent plus unreacted base. The solvent was stripped off leaving a relatively fluid, light brown oil weighing 107 g. containing approximately a 10% solution of the product in the parent amine. After being chilled and on standing, this oil gave 1,1-bis-(hydroxypolyethoxypolyoxyisopropyl) - 1-[2 - (bis-hydroxypolyethoxypolyoxyisopropyl)aminoethyl]hydrazinium chloride as a white, waxy semi-solid, melting indefinitely from 49–63° C. The product contained 0.91% chloride as titrated by the standard Volhard procedure. This would indicate that the product isolated had an average molecular weight of about 2565. The product, like the starting base, was soluble or dispersible in ethyl alcohol, carbon tetrachloride and aromatic solvents.

Example IV

In another experiment, 100 g. of "Tetronics 701" was dissolved in chloroform and treated with a large excess of chloramine over a period of many hours. After removal of the resultant ammonium chloride by filtration, the solvent was evaporated from the filtrate yielding a straw colored liquid. Work-up of the residue gave 56.9 g. of product containing 1.05% Cl or approximately 98% pure.

*Example V*

"Tetronics 704," similar in appearance to "Tetronics 701," is made by treating a polyoxypropylated ethylenediamine of a molecular weight of about 2700 with ethylene oxide until the oxyethyl groups make up about 45% of the weight of the reactant giving a new molecular weight of about 5400. Using essentially the same procedure as in the previous example, there was obtained 91.4 g. of straw-colored product containing 0.98% chloride.

*Example VI*

"Tetronics 304" is much lower in molecular weight (approximately 1700) than either "Tetronics 701" or "Tetronics 704." It is made by treating a polyoxypropylated ethylenediamine of a molecular weight about 750 with ethylene oxide until the oxyethyl groups make up about 45% of the molecular weight of the reactant. Analysis of the terminal hydroxyl groups show the molecular weight of the "Tetronics 304" to be about 1250. Using essentially the same experimental procedure as in Example IV, 100 g. of "Tetronics 304" dissolved in chloroform was treated with a large excess of chloramine to yield 62.2 g. of a straw-colored product having a chloride analysis of 3.47%.

*Example VII*

The reaction of chloroform solutions of our novel compounds with varying amounts of tolylene diisocyanate followed by evaporation of the solvent gave a series of light amber resins.

We claim:

1. Compositions having a molecular weight up to about 27,000 and the general formula:

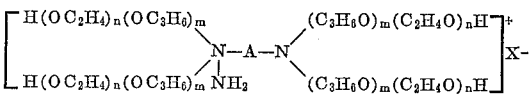

wherein A is an alkylene radical of two to four carbon atoms; $m$ and $n$ are integers other than zero; and X is an inorganic anion.

2. Compositions having a molecular weight up to about 27,000 and the general formula:

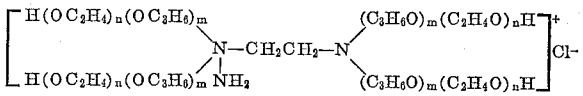

wherein $m$ and $n$ are integers other than zero.

References Cited by the Examiner

UNITED STATES PATENTS 2,674,619   10/53   Lundsted _____ 260—584
2,955,108   10/60   Omietanski _____ 260—584

OTHER REFERENCES

Omietanski et al.: Journal of American Chemical Society, volume 78 (1956), pages 1211–13.

CHARLES B. PARKER, *Primary Examiner.*